Patented Aug. 27, 1940

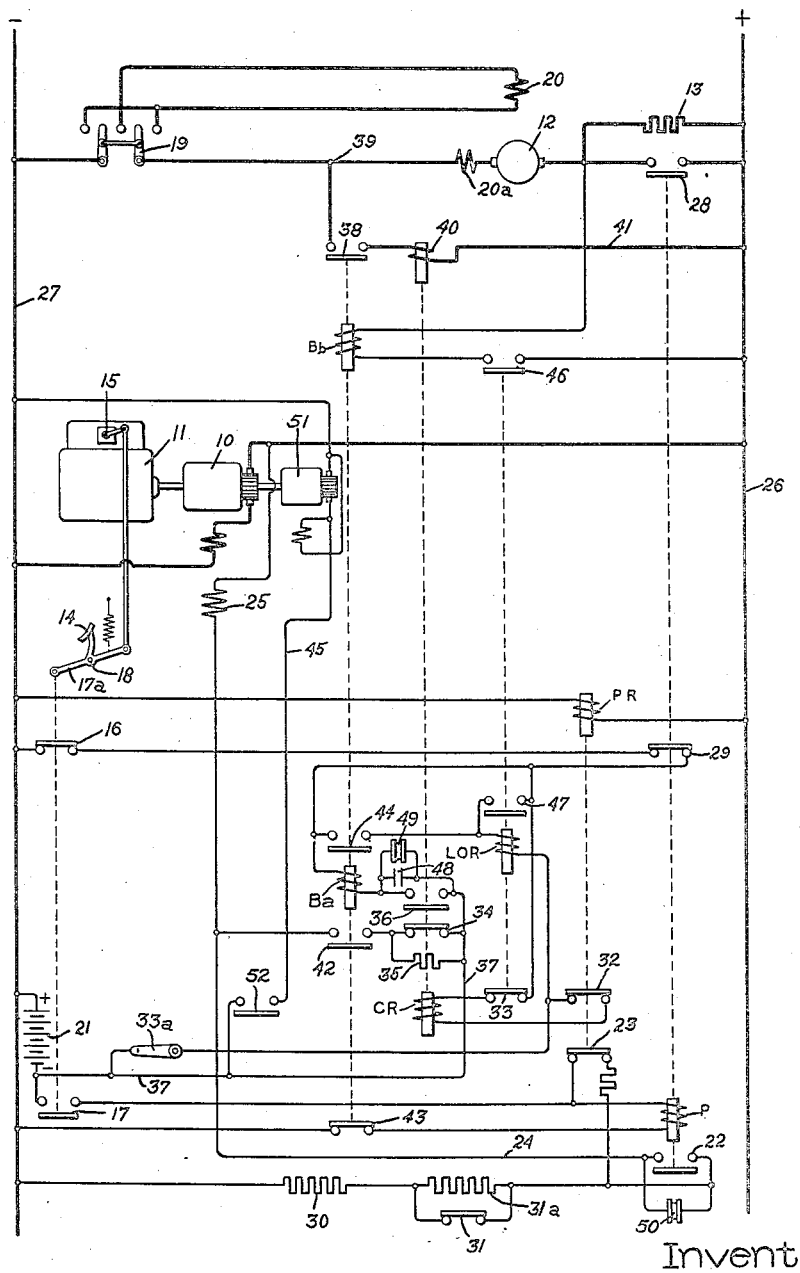

2,213,089

UNITED STATES PATENT OFFICE 2,213,089

SYSTEM OF CONTROL

Otto A. Keep, Harborcreek, and John C. Aydelott, Erie, Pa., assignors to General Electric Company, a corporation of New York Application November 5, 1938, Serial No. 239,042

14 Claims. (Cl. 172—239)

Our invention relates to systems of control and has for its object a simple and reliable control system provided with electric dynamic braking for electrically driven vehicles.

More specifically, an object of this invention is a coasting dynamic braking system for a Diesel or other internal combustion engine driven electric vehicle, which system utilizes the electric traction motors to supply a braking torque approximately equivalent to that supplied by the engine compression on a vehicle with the conventional mechanical drive from the engine.

In accordance with the invention, the vehicle is controlled by an accelerator pedal for acceleration and motoring of the vehicle and the dynamic braking is applied by movement of the pedal to its idling position. Dynamic braking is obtained by connecting a resistor across the motor armature and energizing the motor field with power available from the generator when the engine is idling. We furthermore provide means for automatically regulating the motor field so as to obtain a uniform dynamic braking effort over a wide speed range.

For a more complete understanding of our invention, reference should be had to the accompanying drawing the single figure of which is a diagrammatic representation of a system of control for a Diesel electric bus embodying our invention.

Referring to the drawing, the invention is disclosed in one form in connection with a prime mover, shown as a Diesel engine, driven electric generator drive for a bus. The generator 10 is driven by the Diesel engine 11 and develops direct current electric power for the direct current driving motor 12. For dynamic braking operation, the motor 12 is connected across a resistor 13. The control is carried out by a manually operated device, shown as a pedal 14, which operates the Diesel engine throttle 15 and the two switches 16 and 17. As shown, the pedal 14 is pivoted at the point 18 and operates a lever 17a one end of which is connected to the throttle and the other end of which is connected to the switches. A manually operated reversing switch 19 is provided for reversing the connections of the series motor field 20 for forward or reverse operation of the vehicle. The motor is provided also with a commutating field 20a.

Preferably the engine 11 is started with the reversing switch 19 in its neutral or open circuit position as shown. With the engine idling, the reversing switch 19 is thrown to the forward or reverse position as desired. The pedal 14 is then depressed to start the vehicle. The first movement of the pedal opens the normally closed switch 16. Further movement of the pedal closes the normally open switch 17 thereby connecting the P operating coil directly across the vehicle storage battery 21 whereby the coil P picks up its armature and closes the following circuits:

P switch 22 closes closing a generator shunt field teasing circuit from the battery 21. This circuit leads from the negative battery terminal through the switch 17, the switch 23 which is closed, the switch 22, conductor 24, field 25 of the generator 10 to the side of the generator connected to the positive supply conductor 26, through the generator to the other supply conductor 27 and back to the positive side of the battery.

The P switch 28 closes thus connecting the motor 12 directly to the generator 10.

The P switch 29 opens which prevents the operation of various dynamic braking operating coils to be hereinafter referred to until after the switch 28 opens to establish dynamic braking even though the switch 16 may be reclosed by operation of the pedal 14.

The generator voltage builds up in the same direction as the voltage of the battery 21 connected in its field circuit and therefore assists the battery in energizing the field 25. When the generator voltage has built up to a predetermined value such as between 40 and 60 volts, the PR coil is energized sufficiently to pick up its armature and open its switch 23 whereby the battery is disconnected from the generator field. The generator is now self-excited, the field circuit being from the main 27 through the resistance 30, normally closed switch 31, the switch 22, conductor 24 and field winding 25 of generator 10 to the main 26.

From this point on the rate of acceleration and ultimate speed are entirely under the control of the throttle opening of the engine, i. e., under the control of the pedal 14, the operation being similar to the conventional mechanical drive. For low speed operation, the manually operated switch 31 may be opened to insert the resistance 31a in the generator field circuit.

Braking operation

Dynamic braking is established by releasing the pedal 14 and thereby allowing it to return to its biased idling position. As the pedal returns to the idling position, the switch 17 first opens which deenergizes the P coil whereby the switches 22 and 28 open and the switch 29 closes to provide for the braking connections.

The switch 22 opens the circuit of the generator field and the generator voltage decreases rapidly and energization of the PR coil is decreased sufficiently for its armature to drop and close the switches 23 and 32. The PR coil is not energized sufficiently during braking to pick up its armature.

The closing of the P switch 29 establishes a circuit for the CR coil for energization of the coil from the battery 21. This circuit leads from the supply main 27 through the switch 16, the P switch 29, LOR switch 33, the CR coil, PR switch 32, and manual switch 33a to battery negative. The CR coil thereupon picks up its switches as follows:

The normally closed CR switch 34 opens thereby removing a short circuit around the resistance 35.

The normally open CR switch 36 closes thereby energizing the Ba coil. The circuit of the coil is from main 27 through the switch 16, the switch 29, the Ba coil, the switch 36, the conductor 37 and the battery 21 to the main 27. The Ba coil picks up its switches as follows:

The B switch 38 closes connecting the braking resistance 13 across the armature 12 of the motor and also connecting the motor field 20 through the switch 38 directly across the supply conductors 26 and 27 so as to be energized from the generator 10. It will be observed that the circuit from the point 39 through the switch 38, the CR auxiliary current coil 40 and the conductor 41 to the main 26 is common to both the circuit of the motor dynamic braking resistance 13 and the circuit of the motor field winding 20.

The normally open B switch 42 closes thus closing a battery circuit for the generator shunt field 25. This leads from the negative side of the battery 21 through the conductor 37, the resistance 35, the CR switch 34 being open, the switch 42, the generator field 25, positive side of the generator, and supply main 27 back to the positive side of the battery.

The B normally closed switch 43 opens thus preventing energization of the P coil until after the switch 38 has opened even through the switch 17 may be reclosed by the pedal.

The B switch 44 closes thereby energizing the LOR coil. This circuit leads from the battery negative through the charging manual switch 33a, the LOR coil, the switch 44, switch 29, switch 16 and supply main 27 back to the other side of the battery. The energization of the LOR coil establishes circuits as follows:

The LOR normally open switch 46 closes connecting the Bb holding coil across the dynamic braking resistance 13 so that this coil is energized in accordance with the voltage drop across the resistance.

The LOR switch 47 closes thereby establishing a sealing circuit in parallel with the switch 44 for the LOR coil.

The LOR normally closed switch 38 opens thereby disconnecting the CR coil, which is a pickup coil, from the battery 21 and deenergizing this coil. Thus operation of the CR switch is now directly under the control of its current coil 40 alone.

Dynamic braking is now established and the braking effect remains approximately uniform as long as the speed of the vehicle remains above a predetermined minimum speed, such as 15 M. P. H., and braking continues as long as the switch 36 in the dynamic braking circuit is held closed. The braking effect is maintained substantially uniform over this wide range of vehicle speed by means of the current responsive coil 40 which operates to control the amount of field excitation supplied to the generator field 25. The coil 40 and its armature are so arranged that when the current through the coil 40 becomes less than a predetermined maximum such as 600 amperes, the armature of the coil 40 drops thereby reclosing the switch 34 and short circuiting the resistance 35 in the circuit of the generator shunt field 25. This increases the generator field and causes a rise in the generator voltage. It will be noted that the generator field is energized by the voltage of the generator in series with the battery voltage 21. When the current in the coil 40 becomes greater than the predetermined value of 600 amperes, the coil 40 picks up its armature and opens the switch 34 whereby the resistance 35 is reinserted in the generator field circuit thereby reducing the generator field. This regulatory action of the coil 40 thus maintains a substantially predetermined current in the coil 40.

As a result of this action, the sum of the motor field current and the motor armature current which flows through the coil 40 is maintained substantially constant and a differential excitation characteristic is obtained for the motor. In other words, as the vehicle speed decreases and the dynamic braking current in the coil 40 decreases, the current in the motor field 20 is increased to maintain a predetermined sum value which gives a substantially constant braking effort.

When the vehicle speed falls below the predetermined minimum value of 15 M. P. H., the total current through the coil 40 decreases because the motor field now has its maximum excitation with the switch 34 closed continuously and the CR coil 40 no longer regulates the braking action. The dynamic braking action now decreases and the voltage across the braking resistance 13 decreases. At some predetermined low speed such as 6 M. P. H., the voltage across the braking resistance 13 will be insufficient to energize the Bb coil to hold switch 38 closed and the switch 38 will drop open thus discontinuing the dynamic braking. At the same time, the B switch 42 opens thus opening the generator field, the B switch 44 opens and the B switch 43 recloses so that the P coil can again be energized from the battery when the switch 16 is reclosed upon acceleration of the vehicle.

In the event that power is applied by depressing the pedal before the dynamic braking sequence is complete, the LOR coil, the Bb coil and the CR coil are all deenergized by the opening of the switch 16 upon depression of the accelerating pedal 14.

For the purpose of preventing arcing from high voltages, such as momentary induced voltages, a condenser 48 and a non-linear resistance 49 are connected across the contacts of the CR switch 36 and a non-linear resistance 50 is connected across the contacts of the P switch 22. The non-linear resistance is of the type giving a great increase in current upon an increase in voltage applied to it. Preferably, it is of the type comprising silicon carbide crystals held together by a suitable binder such as described and claimed in U. S. Patent 1,822,742 to Karl B. McEachron, dated September 8, 1931.

A generator 51 driven by the prime mover 11 is provided for charging the battery 21. This generator is connected to the battery by means of a switch 52 which is suitably operated by means not shown in response to battery and generator voltage and current conditions, such as by the control means described and claimed in Patent No. 2,072,783 to H. F. Wilson, issued March 2, 1937.

While we have shown a particular embodiment of our invention, it will be understood, of course, that we do not wish to be limited thereto, since many modifications may be made and we, therefore, contemplate by the appended claims to cover any such modifications as fall within the true spirit and scope of our invention.

What we claim as new and desire to secure by Letters Patent of the United States is:

1. In a system of control, the combination with a momentum driven dynamo-electric machine having an armature and a field winding, of a dynamic braking resistor, connections for connecting said resistor in a dynamic braking circuit including said armature, excitation means for exciting said field winding to effect dynamic braking of said dynamo-electric machine, the circuit of said field winding and said dynamic braking circuit having a common connection, and means responsive to the current in said common connection for controlling said excitation means.

2. In a system of control, the combination with a momentum driven dynamo-electric machine having an armature and a field winding, of a dynamic braking resistor, connections for connecting said resistor in a dynamic braking circuit including said armature, excitation means for exciting said field winding to effect dynamic braking of said dynamo-electric machine, the circuit of said field winding and said dynamic braking circuit having a common connection, means responsive to the current in said common connection for controlling said excitation means, and means responsive to the voltage across said resistor for disconnecting said resistor from said motor.

3. In a system of control, the combination with a momentum driven dynamo-electric machine having an armature and a field winding, of a dynamic braking resistor, connections for connecting said resistor in a dynamic braking circuit including said armature, a generator, connections including a common portion of said dynamic braking circuit for connecting said generator to said field winding to effect dynamic braking of said dynamo-electric machine, means for driving said generator, and means responsive to the current in said common circuit portion connection for controlling said generator.

4. In a system of control, the combination with a momentum driven dynamo-electric machine having an armature and a field winding, of a dynamic braking resistor, connections for connecting said resistor in a dynamic braking circuit across said armature, of a generator having a field winding, connections including a common portion of said braking circuit for connecting said generator to said field winding to effect dynamic braking of said dynamo-electric machine, means for driving said generator at a substantially constant speed, and means responsive to the current in said common circuit portion for regulating the field winding of said generator to maintain a predetermined constant current in said common connection.

5. The combination with a direct current traction motor provided with a series field winding, of a generator provided with a field winding for supplying current to said motor, a dynamic braking resistor for said motor, connections for connecting said resistor in a dynamic braking circuit across said motor and for connecting said motor field winding in the circuit of said generator, said dynamic braking circuit and said field circuit including a common connection, a coil in said common connection, and means actuated by said coil for controlling said generator field winding so as to maintain a predetermined current in said common connection whereby a substantially constant braking effort is exerted by said motor.

6. The combination with a direct current traction motor provided with a series field winding, of a generator provided with a field winding for supplying current to said motor, a dynamic braking resistor for said motor, connections for simultaneously connecting said resistor in a dynamic braking circuit across said motor and said motor field winding in the circuit of said generator, said dynamic braking circuit and said field circuit including a common connection, a coil in said common connection, and means actuated by said coil for controlling said generator field winding so as to maintain a predetermined current in said common circuit whereby a substantially constant braking effort is exerted by said motor.

7. The combination with a direct current traction motor provided with a series field winding, of a generator provided with a field winding for supplying current to said motor, a dynamic braking resistor for said motor, connections for connecting said resistor across said motor to form a dynamic braking circuit and for connecting said motor field winding in the circuit of said generator, said dynamic braking circuit and said field circuit including a common connection, a coil in said common connection, and means actuated by said coil for controlling said generator field winding so as to maintain a predetermined current in said common connection whereby a substantially constant braking effort is exerted by said motor, and means responsive to the voltage across said resistor for disconnecting said resistor from said motor.

8. In a vehicle drive system, a direct current traction motor, a generator provided with a field winding for supplying current to said motor, means for driving said generator, a dynamic braking resistor for said motor, a manually operated device biased to a low speed position for controlling the speed of said driving means, a storage battery, a switch operated by movement of said manually operated device in a direction to increase the speed of said driving means for connecting said motor to said generator for motoring operation and for connecting the field of said generator to said storage battery in series with said generator for initial excitation of said generator field, means responsive to the voltage of said generator for disconnecting said battery from said generator field winding, and means responsive to movement of said manually operated device to its low speed position for disconnecting said motor from said generator and connecting said resistor to said motor for dynamic braking.

9. In a vehicle drive system, a direct current traction motor provided with a field winding, a generator provided with a field winding for supplying current to said motor, means for driving said generator, a dynamic braking resistor for said motor, a manually operated device biased to a low speed position for controlling the speed of said driving means, a storage battery, a switch operated by movement of said manually operated device in a direction to increase the speed of said driving means for connecting said motor to said generator for motoring operation and for connecting the field of said generator to said storage battery in series with said generator for initial excitation of said generator field, means responsive to the voltage of said generator for disconnecting said battery from said generator field winding, means responsive to movement of said manually operated device to its low speed position for disconnecting said motor from said generator and connecting said resistor to said motor for dynamic braking, and means responsive to the voltage across said braking resistor for disconnecting said resistor from said motor.

10. In a vehicle drive system, a direct current traction motor provided with a field winding, a generator provided with a field winding for supplying current to said motor, a means for driving said generator, a dynamic braking resistor for said motor, a manually operated device biased to a low speed position for controlling the speed of said driving means, a switch operated by movement of said manually operated device in a direction to increase the speed of said driving means for connecting said motor to said generator for motoring operation, means responsive to movement of said manually operated device to its low speed position for disconnecting said motor from said generator, connecting said resistor in a dynamic braking circuit to said motor for dynamic braking and connecting said motor field to said generator, the circuit of said motor field having a connection common with said dynamic braking circuit, means responsive to the voltage across said braking resistor for disconnecting said resistor from said motor, and means responsive to the current in said common connection for regulating the field winding of said generator to maintain a predetermined constant current in said connection whereby said generator is caused to supply a current to said motor field winding which is the difference between said predetermined constant current and the current in said resistor.

11. In a vehicle drive system, a direct current traction motor provided with a field winding, a generator provided with a field winding for supplying current to said motor, means for driving said generator, a dynamic braking resistor for said motor, a manually operated device biased to a low speed position for controlling the speed of said driving means, a storage battery, a switch operated by movement of said manually operated device in a direction to increase the speed of said driving means for connecting said motor to said generator for motoring operation and for connecting the field of said generator to said storage battery in series with said generator for initial excitation of said generator field, means responsive to the voltage of said generator for disconnecting said battery from said generator field winding, means responsive to movement of said manually operated device to its idling position for disconnecting said motor from said generator, connecting said resistor in a dynamic braking circuit to said motor for dynamic braking and connecting said motor field to said generator, the circuit of said motor field having a connection common with said dynamic braking circuit, means responsive to the voltage across said braking resistor for disconnecting said resistor from said motor, and means responsive to the current in said common connection for regulating the field winding of said generator to maintain a predetermined constant current in said connection whereby said generator is caused to supply a current to said motor field winding which is the difference between said predetermined constant current and the current in said resistor.

12. In a system of control, the combination of a momentum driven dynamo-electric machine having an armature and a field winding, of electric braking means for said vehicle, connections for connecting said braking means in a braking circuit including said armature, connections for supplying current to said field winding to effect operation of said braking means by generator operation of said dynamo-electric machine, the circuit of said field winding and said braking circuit having a common connection, and current responsive means independent of said braking means included in said common connection for controlling the current in said field winding.

13. In a system of control, the combination of a momentum driven dynamo-electric machine having an armature and a field winding, of a dynamic braking resistor, connections for connecting said resistor in a dynamic braking circuit including said armature, a generator provided with a field winding for supplying current to the field winding of said dynamo-electric machine to effect dynamic braking of said dynamo-electric machine, the circuit of the field winding of said dynamo-electric machine and said dynamic braking circuit having a common connection, and current responsive means independent of said resistor included in said common connection so as to be responsive to the combined current in said resistor and said field winding for controlling the field winding of said generator to control the current in the field winding of said dynamo-electric machine.

14. In a system of control, the combination of a momentum driven dynamo-electric machine having an armature and a field winding, of a dynamic braking resistor, connections for connecting said resistor in a dynamic braking circuit including said armature, connections for supplying current to said field winding to effect dynamic braking of said dynamo-electric machine, the circuit of said field winding and said dynamic braking circuit having a common connection, and means independent of said resistor responsive to the current in said common connection for controlling the current in said field winding.

OTTO A. KEEP.
JOHN C. AYDELOTT.